Nov. 13, 1962  H. C. HARBERS ET AL  3,063,703
VEHICLE-SUSPENSION MEANS
Filed Dec. 1, 1958  2 Sheets-Sheet 1
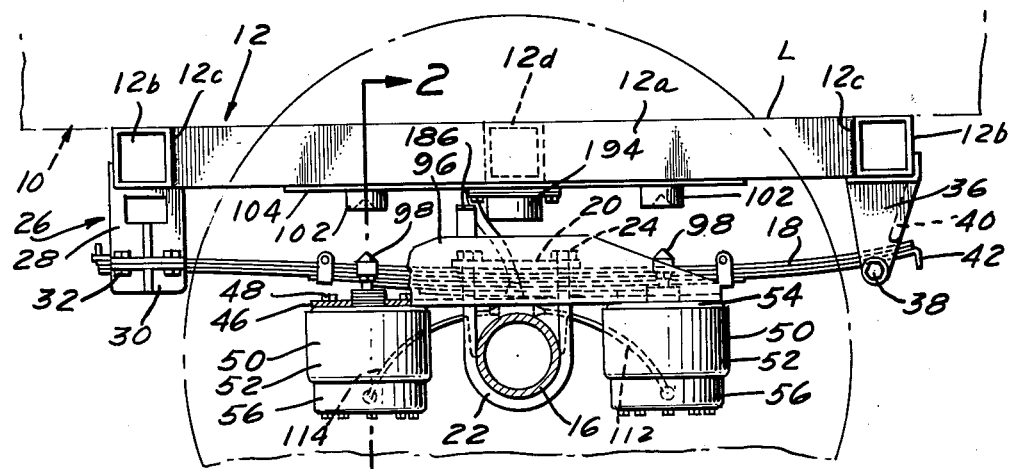
Fig. 1.
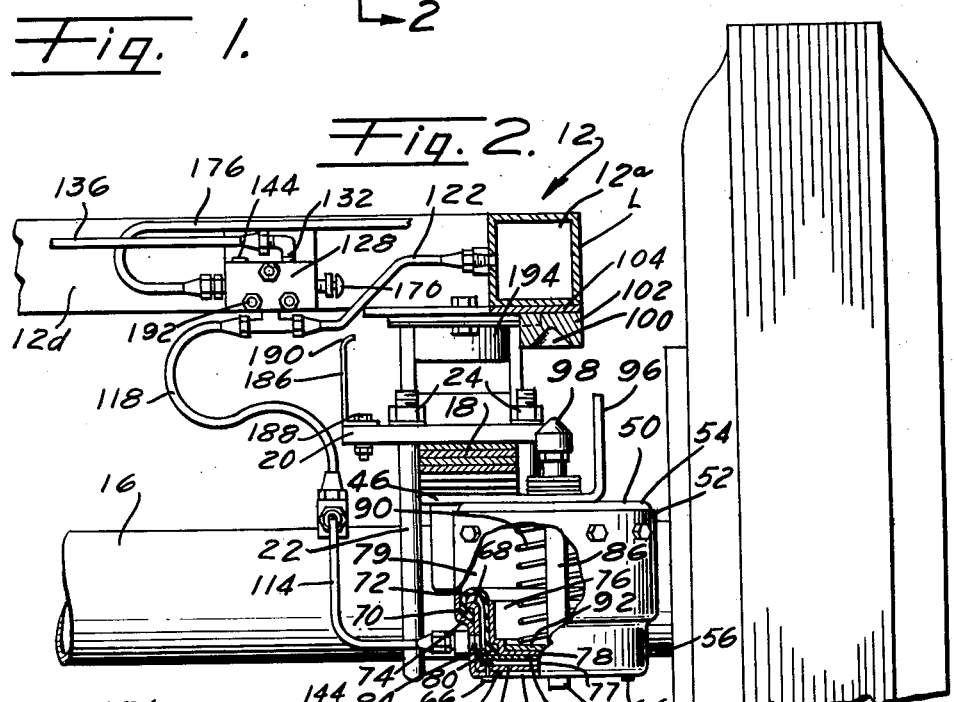
Fig. 2.
Fig. 5.
Henry C. Harbers,
Buck C. Hamlet,
INVENTORS.
BY
Attorney Henry C. Harbers,
Buck C. Hamlet,
INVENTORS.

BY
Attorney

United States Patent Office 3,063,703
Patented Nov. 13, 1962

3,063,703
VEHICLE-SUSPENSION MEANS
Henry C. Harbers, Pasadena, and Buck C. Hamlet, La Puente, Calif., assignors to Western Unit Corporation, Industry, Los Angeles, Calif., a corporation of California
Filed Dec. 1, 1958, Ser. No. 777,472
14 Claims. (Cl. 267—65)

This invention relates generally to vehicle-suspension means and relates more particularly to suspension means for vehicles having widely varying-load conditions.

While the invention has particular utility in connection with the suspension means for trailers and semi-trailers which may be used with a heavy load or with little or no load, and as shown and described in such connection, it is to be understood that its utility is not confined thereto.

A difficult problem is involved in providing suspension means for vehicles, such as trailer and semi-trailers, which are usually operated either with a heavy load or with little or no load, that is, empty. When we refer to the vehicle as being empty, it is to be understood that there may be no load in the vehicle or there may be a relatively light load.

Should leaf springs, or the like, be used, which are strong enough to properly support the vehicle when loaded, such springs will be too stiff for the empty vehicle and the ride thereof will be extremely rough. Should the springs have the proper characteristics to give good riding qualities for an empty vehicle they will not supply proper support for the heavily loaded vehicle.

It is, therefore, a purpose of this invention to provide suspension means for vehicles of the above character which will solve the problem of giving proper ride characteristics for such vehicles under both loaded and empty operating conditions.

The invention contemplates an arrangement using both leaf springs and air-cushioning means. The springs, among other things, control the lateral alignment of the axle, take the brake torque, and give the trailer its ride. The springs in the present arrangement provide support for the vehicle when empty, while the air-cushioning means cooperates with the springs to support the vehicle when loaded.

Another purpose of the invention is to provide vehicle-suspension means of this character wherein the air cushion or spring means is automatically brought into operation by the weight of vehicle load.

Still another purpose of the invention is to provide air-cushioning means including a reservoir having a relatively large cushioning capacity.

A further purpose of the invention is to provide a reservoir of such size and capacity as to create the proper oscillating frequency of the suspension means. The size of the reservoir is calculated in relation to the motion and weight of the load the vehicle is designed to carry.

Another purpose of the invention is to provide in apparatus of this character, a reservoir which constitutes part of the sub-frame of the vehicle.

Still another purpose of the invention is to provide suspension means wherein the air-cushioning means is manually released.

A further purpose of the invention is to provide vehicle-suspension means that is simple in construction and operation.

A still further purpose of the invention is to provide vehicle suspension means that is relatively inexpensive to manufacture and to service.

The characteristics and advantages of the invention are further sufficiently referred to in connection with the following detailed description of the accompanying drawings which represent one embodiment. After considering this example, skilled persons will understand that many variations may be made without departing from the principle disclosed and we contemplate the employment of any structures, arrangements, or modes of operation, that are properly within the scope of the appended claims.

Referring to the drawings, which are for illustrative purposes only:

FIG. 1 is a side elevational view of a vehicle-suspension means embodying the present invention.

FIG. 2 is a sectional view taken on line 2—2 of FIG. 1.

FIG. 5 is an enlarged diagrammatic sectional view of one of the control valves.

Figure 3:
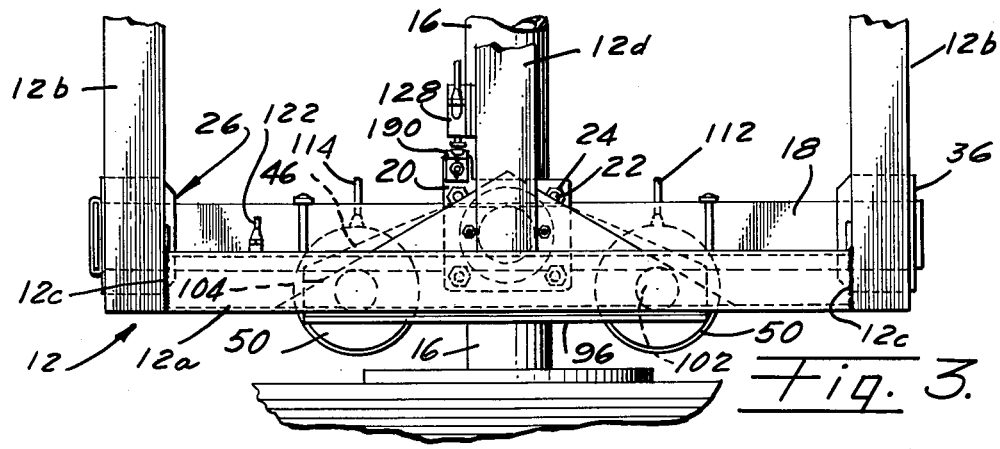
FIG. 3 is a plan view of one side of the suspension means.

Referring more particularly to the drawings, there is shown a portion of a vehicle frame, indicated generally at 10, having a hollow sub-frame, indicated generally at 12. The sub-frame is rectangular in form and is secured to the frame 10 of the vehicle by any suitable well-known means, such as welding or the like, not shown. The sub-frame 12 has side members 12a and end members 12b, the latter being welded, as at 12c, to the ends of the members 12a and seal said ends. There is also a central transverse member 12d having its ends welded to the respective members 12a. The members 12a serve as fluid reservoirs for the pneumatic system as will be described more particularly hereinafter.

While the vehicle may have a plurality of axles, only one is shown and indicated at 16. Adjacent to each end of said axle is a leaf spring 18 having the central portion secured to said axle by means of the usual spring plate 20 and U-shaped tie bolts 22 having the usual nuts 24 at the ends thereof. One end of each spring 18, shown as the forward end, has an end portion secured in a spring hanger, indicated generally at 26. The hanger 26 is of known character and comprises an upper member 28 which is secured to the sub-frame 12 by any suitable means, such as welding or the like, and a lower member or cap 30 is secured to the lower end of the member 28 by means of bolts 32, and the forward end portion of the spring 18 is held in a fixed position against longitudinal movement by said hanger. The rear end portion of the spring 18 is operably received in a spring guide 36 which is secured to the rear of the sub-frame by welding or other suitable means. The rear end of the spring 18 is adapted to be slidably held in the guide 36, there being the usual bolt 38 beneath the spring and a wall member 40 above the spring. The rear end portion of the spring is, therefore, free to move longitudinally in the usual manner but is held against lateral movement and one of the leaves of said spring is provided with a down-turned end 42 to limit inward movement of said spring and thus prevent inadvertent separation of the spring from the guide 36.

As stated above, there is a spring 18 at each side of each of the vehicle axles and said springs 18 have the proper ride characteristics for the vehicle when unloaded, but there is means associated with each spring for providing supplemental suspension when the vehicle is loaded and said means is pneumatic in character.

Between the central portion of each spring and the adjacent portion of the axle is clamped a plate 46, to the under side of which and at each end is secured by means of screws 48 a pneumatic motor device 50. These devices are of known character and will be but briefly described. Each of these motor devices includes a cylindrical housing 52 with a top cover 54. At the lower end of the cylindrical housing 52 there is a reduced diameter portion 56 which has a relatively large opening 58 therein defined by a flange 60 formed by turning inwardly a lower end portion of the reduced diameter portion 56.

Within the device 50 there is a cup-shaped member 64 which is secured to the flange 60 by means of rivets 66. At its upper end the cup-shaped member 64 has an outwardly turned edge portion 68 which receives a bead 70 about the upper marginal edge of a flexible diaphragm 72. The bead 70 is held against the shoulder 74 formed at the junction of the lower end of the cylindrical housing and the reduced diameter portion 56 thereof. Within the cup-shaped member 64 is a diaphragm assembly which includes said diaphragm 72 and a cup-shaped diaphragm retainer 76 which has an inwardly formed recess 78 at the bottom for reception of a bead 80 of the diaphragm about the lower edge thereof. Secured to the under side of the retainer 76 is a reinforcing plate 82 secured to the retainer 76 and provided with an upturned marginal edge 84, the bead 80 being securely clamped between the retainer 76 and the plate 82.

Axially disposed in the device 50 is a rod 86 the lower end of which is secured to the diaphragm assembly by any suitable well-known means such as a bolt 88 and said rod extends upwardly through an opening provided therefor in the cover 54. The diaphragm assembly is urged downwardly by means of a spring 90 operably disposed about the rod 86 and reacting against the cover 54 and a spring retainer 92 resting on the bottom of the diaphragm retainer 76.

The device 50 thus has a pressure chamber 77 below and at the outer sides of the diaphragm assembly and a chamber 79 at the opposite side thereof, chamber 79 being freely vented to atmosphere by means of vents, not shown.

Plate 46 has an upturned outer-edge portion 96 which moves upwardly to be disposed at the outer side of the adjacent part of the sub-frame 12 when the vehicle is loaded. The rod 86 extends upwardly through aligned openings provided therefor in the cover 54 and the rod 86 and carries a conical head 98 at the upper end thereof adapted to be received in a correspondingly-shaped recess 100 in a socket 102 secured, by welding or the like, to the underside of a plate 104 which, in turn, is secured, by welding or other suitable means, to the underside of the adjacent sub-frame member 12a.

The pressure chambers 77 of the pneumatic devices 50 for the spring 18 are connected together by conduits 112 and 114, said conduits being connected at their junction by means of a T 116 which, in turn, has a connection 118 leading to a T 120. T 120 has a connection 122 with the adjacent reservoir 12a of the sub-frame 12, said reservoirs 12a being independent of each other and serving as additional pneumatic cushioning for the devices 50 with which they are connected. The T also has a connection 124 with a port 126 of a button bleeder valve 128 of well known type. Port 126 is located midway between the ends of a cylinder 130 of the valve 128 and said cylinder is provided with an inlet port 132 which, as viewed in FIG. 5, is spaced longitudinally to the right relative to port 126 and is connected with a check valve 134 by means of a conduit 136. The valve 128 for the opposite spring of axle 16 is similarly constructed and has a similar connection with the check valve 134. Check valves 134 are connected to a source of pressure, such as a pressure storage tank 139 by means of a conduit 140 and branch conduits 142, the latter leading to said check valves. Means for supplying the tank 139 is provided and may be the usual pump P for the air-brake system of the vehicle.

Each valve 128 is provided with an exhaust port 144 to atmosphere spaced longitudinally to the left of the port 126, and a spool valve, generally indicated at 146, is disposed within the cylinder 130 and slidable therein. Spool valve 146 comprises a pair of spools 148 and 150 axially spaced apart and connected by a reduced diameter portion 152. The valve 146 is shorter than the cylinder 130 and there are pressure connections 154 and 156 between the inlet 132 and the respective ends of the cylinder 130. The cylinder 130 has the ends closed by respective end walls 158 and 160 which are provided with tapped openings 162 and 164. The opening 162 is provided with a button bleeder 166 which is threaded into the opening 162 and has a bleed vent 168 therein controlled by a valve member 170. When said valve member 170 is in its outer position the bleed vent 168 is closed and when said button 170 is pushed inwardly said vent is opened, the button bleeder being normally closed. The opposite end of the valve 128 is provided with a remote-control button bleeder 174 having a connection 176 with a fixture 178 secured in the tapped opening 164. The button bleeder 174 is provided with a bleed vent 180 and a button valve 182 for controlling same. Normally the button valve 182 is in its outer position whereat the bleed is closed but when pushed inwardly it opens the bleed vent 180. When the button bleed vents at the ends of the valve 128 are closed the pressures at the ends of the spool valve member 146 are in balance.

Figure 4:
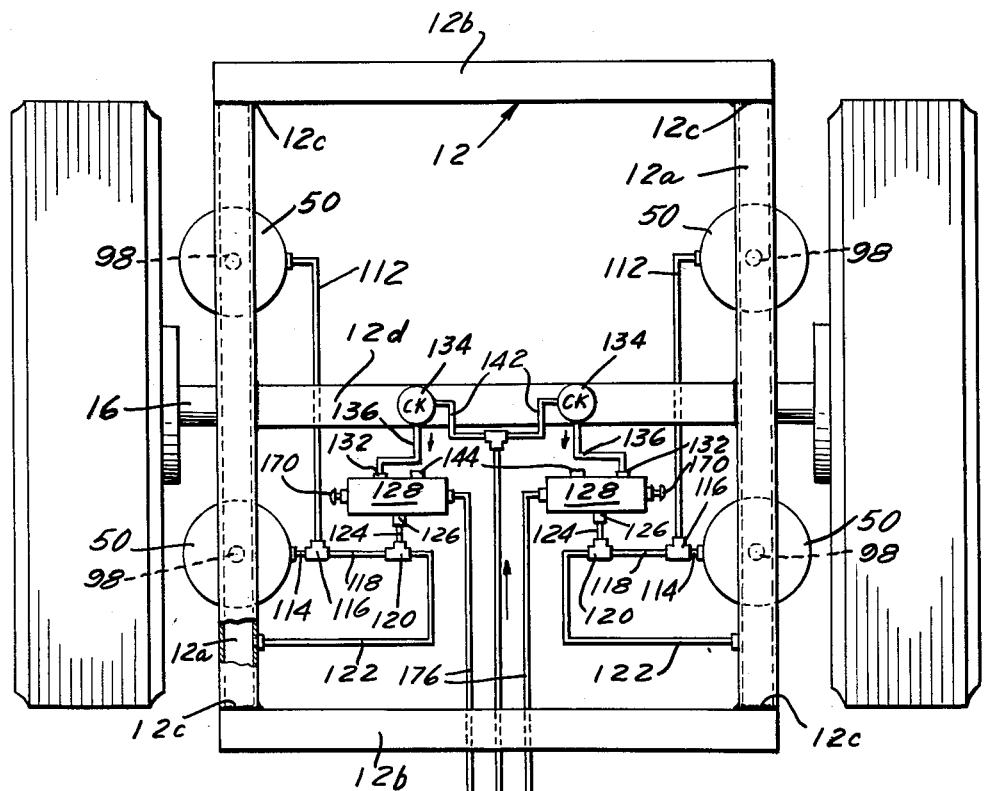
FIG. 4 is a schematic view of the pneumatic system of the apparatus.

Spring plate 20 has an upstanding valve-actuating arm 186 which is secured to said plate by means of a screw 188. The upper end of the arm 186 is curved at 190 and said arm is adapted to move upwardly to engage the button 170 of the bleeder 166, the valve 128 being secured by screws 192, or the like, to the adjacent portion of the sub-frame so that the button 170 is in the path of movement of the arm 186 and will be forced inwardly by said arm when the vehicle frame is moved downwardly by the weight of the load. It is to be noted that when the vehicle is loaded the button 170 is engaged by said arm adjacent the center thereof so that the valve will be maintained open even though there are oscillatory movements which vary the spacing between the axle and supporting frame. When the button bleeder is in the open position air pressure is relieved in the adjacent end of the cylinder so that pressure at the opposite end will force the spool valve 146 rightwardly as viewed in FIG. 4 and connect the inlet port 132 with the port 126 so that pressure fluid is applied to the under side of the diaphragms of the motor devices 50. This pressure causes the diaphragm to move upwardly and cause the conical head 98 to enter the conical socket 100.

As both of the devices 50 at both ends of the axle are actuated when the vehicle is loaded, supplemental pneumatic suspension is therefore provided for the vehicle under such condition. This pneumatic suspension added to the springs 18 provides the proper suspension and ride for the vehicle when loaded.

When the vehicle is unloaded the frame is raised by the springs and the pneumatic suspension to effect closing of the button bleeder 166. Pressure at opposite ends of the spool valve 146 is again equalized and in order to disconnect the pneumatic suspension the button bleeder 174 is pushed inwardly to relieve the pressure in the left end of the cylinder 130 so that the pressure applied to the opposite end of the spool valve 146 will cause same to move to the left to close the port 132 and open the port 144, thus relieving the air pressure within the pneumatic motor devices 50. The springs 90 of said devices will then move the rods 86 to their lower positions whereat the heads 98 are out of engagement with the sockets 102. It is believed that it will be apparent that each side of the vehicle at each axle is independently supported by the suspension means which comprises both the springs and the pneumatic mechanism.

Resilient rubber bumpers 194 of the usual well-known character are provided above the axles.

It is thought that the invention and many of its attendant advantages will be understood from the foregoing description and it is thought that it will be apparent that various changes may be made in the form, construction and arrangement of the parts of the invention without departing from the spirit and scope thereof or sacrificing all of its material advantages, the embodiment hereinbefore described being merely a preferred one.

What we claim is:

1. Vehicle-suspension means, comprising: a sub-frame having side and end members, two of said members being hollow with the interiors thereof independent of each other; a transverse axle beneath said sub-frame; a leaf spring at each end of the axle; means fixedly securing the front end of each spring to the adjacent portion of the sub-frame; a mount for each spring adjacent the opposite end for supporting said spring end while permitting longitudinal movement thereof, said mounts being secured to the sub-frame; means at the rear end of each spring preventing same from inadvertent separation from the respective mount; a pair of pneumatic motor devices adjacent each end of the axle, one of said devices being forwardly of the axle and the other rearwardly thereof; means securing each pair of motor devices to the axle; each of said motor devices comprising a housing with a diaphragm assembly therein, there being a pressure chamber at one side of the diaphragm and a chamber vented to atmosphere at the other side; a rod axially secured to the diaphragm assembly and extending upwardly of the upper end of the device; a conical head on the rod; a socket for each of said devices secured to the adjacent portion of the sub-frame and having a socket opening facing said head and adapted to receive same when the rod is moved upwardly by pressure in the pressure chamber; means interconnecting the pressure chambers of the motor devices at the respective ends of the axle and with one of said hollow sub-frame members; a source of pressure fluid for said motor devices; conduit means connecting said source of pressure with said motor devices; a check valve in said conduit means for each pair of motor devices; a control valve for each pair of motor devices, connected into the conduit means thereto, said valve being secured to the sub-frame, each of said control valves having a valve member adapted to be actuated between a position connecting the source of pressure fluid with a pair of motor devices and another position connecting the pressure chambers of said devices to atmosphere; means for said control valve adapted, when actuated, to effect movement of said valve member to the position whereat said source of pressure fluid is connected with the pressure chambers of said pair of pneumatic-motor devices; an arm connected to each spring and adapted to actuate said valve-control member when the vehicle is loaded and there is relative movement between the axle and sub-frame to thereby connect the source of pressure fluid with the pressure chambers of said pair of pneumatic-motor devices; and second control means for said valve adapted to be manually actuated and when actuated to cause the valve member to connect the pressure chambers of said pair of pneumatic-motor devices with atmosphere.

2. Vehicle-suspension means, comprising: a sub-frame having side and end members, two of said members comprising fluid pressure reservoirs, said reservoirs being independent of each other; a transverse axle; a leaf spring secured to the axle adjacent the respective ends thereof; means operably securing the springs to the sub-frame; a pair of pneumatic-motor devices secured to the axle adjacent each end thereof; one of said devices being forwardly of the axle and the other rearwardly thereof; each of said motor devices having a fluid pressure chamber, a diaphragm assembly subjected on one side to the pressure in said chamber; a rod secured to the diaphragm assembly and extending upwardly of the upper end of the device; a socket secured to the adjacent portion of the sub-frame and having a socket opening aligned with said rod and adapted to receive the upper end thereof when the rod is moved upwardly by pressure in the pressure chamber; means interconnecting the pressure chambers of each pair of motor devices and with one of said reservoirs; a source of pressure fluid for said motor devices; a valve for each pair of motor devices secured to the sub-frame, each of said valves having two operative positions, one connecting the source of pressure fluid with the pressure chamber of its respective pairs of motor devices and the other position connecting said pressure chambers to atmosphere; respective means for actuating said valves to effect connection of said source of pressure fluid with the pressure chambers of respective pairs of pneumatic-motor devices when the vehicle is loaded and there is a predetermined relative movement between the axle and sub-frame; and manually-operable means for respective valves for actuating same to said other position to connect the pressure chambers of respective pairs of pneumatic motor devices with atmosphere.

3. In suspension means for vehicles having a frame: a transverse axle: a leaf spring adjacent each end of the axle and centrally mounted thereto; means operably mounting said springs to the vehicle frame; pneumatic-suspension means including a set of pneumatic-motor devices secured to each end of said axle and at opposite sides thereof; each of said motor devices including a pressure chamber, one wall of which comprises a flexible diaphragm; a connecting member carried by each diaphragm; a receiving member for each connecting member, said receiving members being carried by the vehicle frame and being aligned with respective connecting members, said connecting members being disconnected from the receiving members when the pneumatic motor devices are deenergized; means interconnecting the pressure chambers of each set of motor devices; means defining a reservoir for each set of motor devices; means connecting the pressure chambers of each set of motor devices with a respective resevoir, a source of pressure fluid; valves controlling the pressure fluid to respective sets of motor devices; means carried by said axle for controlling respective valves to connect said source of pressure fluid with the pressure chambers of respective sets of motor devices when there is a pre-determined relative movement of the axle and frame toward each other to thereby connect the source of pressure fluid with the pressure chambers of the pneumatic motors to energize said motor devices and to cause the diaphragms thereof to move the respective connecting members into engagement with the receiving members; means for relieving the pressure in said chambers; and means for moving said connecting members from engagement with said receiving members.

4. In suspension means for a vehicle having a frame structure: a transverse axle structure; a leaf spring adjacent each end of the axle structure and centrally secured thereon; means operably mounting said springs to the vehicle frame structure; pneumatic-suspension means including a set of pneumatic motor devices at each side of the vehicle and secured to one of said structures; each of said motor devices including a pressure chamber, one wall of which comprises a flexible diaphragm; a connecting member carried by each diaphragm; a receiving member for each connecting member, said receiving members being carried by the other structure and being aligned with respective connecting members, said connecting members being disconnected from said receiving members when the pneumatic motor devices are deenergized; means interconnecting the pressure chambers of each set of motor devices; means defining a reservoir for each set of motor devices; means connecting the pressure chambers of each set of motor devices with a respective reservoir; a source of pressure fluid; valves controlling the pressure fluid to respective sets of motor devices; means carried by one of said structures for controlling respective valves to connect said source of pressure fluid with the pressure chambers of respective sets of motor devices when there is a predetermined relative movement of the axle and frame structures toward each other to thereby connect the source of pressure fluid with the pressure chambers of the pneumatic motors to energize said motor devices and to cause the diaphragms thereof to move the respective connecting members into engagement with the receiving members; means for relieving the pressure in said chambers; and means for moving said connecting members from engagement with said receiving members.

5. Suspension means for a vehicle having a frame, comprising: a sub-frame adapted to be secured to said vehicle frame, said sub-frame having side and end members, two of said members being hollow with the interiors thereof independent of each other; a transverse axle; a leaf spring at each end of the axle; means fixedly securing the front end of each spring to the adjacent portion of the sub-frame; a mount for each spring adjacent the opposite end for supporting said spring while permitting limited longitudinal movement thereof, said mounts being secured to the sub-frame; a pair of pneumatic motor devices for each spring, one of said devices being forwardly of the axle and the other rearwardly thereof; means securing each pair of motor devices to the respective ends of the axle; each of said motor devices having a movable-wall assembly defining a pressure chamber; a rod axially secured to the diaphragm assembly and extending upwardly of the upper end of the device; a socket secured to the adjacent portion of the sub-frame and having a socket opening facing the upper free end of said rod and adapted to receive same when the rod is moved upwardly by pressure in the pressure chamber; means interconnecting the pressure chambers of the motor devices at the respective ends of the axle and with one of said hollow sub-frame members; a source of pressure fluid; a valve for each pair of motor devices, said valve being secured to the sub-frame, each of said valves having a valve member adapted to be actuated between the position connecting the source of pressure fluid with the actuators at one end of the axle and another position connecting the pressure chambers of said devices to atmosphere; means for said valve adapted when actuated to effect connection of said source of pressure fluid with the pressure chambers of said pneumatic motors; a valve actuating arm connected to each spring and adapted to actuate the valve control member when the vehicle is loaded and there is relative movement toward each other of the axle and sub-frame to thereby connect the source of pressure fluid with the pressure chambers of the pneumatic motors; and second control means for said valve adapted to be manually actuated and when actuated will cause the valve member to connect the pressure chambers of said pneumatic motors with atmosphere.

6. Suspension means for a vehicle having a frame, comprising: a sub-frame adapted to be secured to said vehicle frame, said sub-frame having side and end members, two of said members being hollow with the interiors thereof independent of each other; a transverse axle; a leaf spring at each end of the axle; means fixedly securing the front end of each spring to the adjacent portion of the sub-frame; a mount for each spring adjacent the opposite end for supporting said spring while permitting limited longitudinal movement thereof, said mounts being secured to the sub-frame; a pair of pneumatic-motor devices for each spring, one of said devices being forwardly of the axle and the other rearwardly thereof; means securing each pair of motor devices to the respective ends of the axle; each of said motor devices having a movable-wall assembly defining a pressure chamber; a rod axially secured to the diaphragm assembly and extending upwardly of the upper end of the device; a socket secured to the adjacent portion of the sub-frame and having a socket opening facing the upper free end of said rod and adapted to receive same when the rod is moved upwardly by pressure in the pressure chamber; means interconnecting the pressure chambers of the motor devices at the respective ends of the axle and with one of said hollow sub-frame members; a source of pressure fluid; a valve for each pair of motor devices, said valve being secured to the sub-frame, each of said valves having a valve member adapted to be actuated between the position connecting the source of pressure fluid with the actuators at one end of the axle and another position connecting the pressure chambers of said devices to atmosphere; means for said valve adapted when actuated to effect connection of said source of pressure fluid with the pressure chambers of said pneumatic motors; and a valve-actuating arm connected to each spring and adapted to actuate the valve control member when the vehicle is loaded and there is relative movement toward each other of the axle and sub-frame to thereby connect the source of pressure fluid with the pressure chambers of the pneumatic motors.

7. In suspension means for a vehicle: a sub-frame structure adapted to be secured to the frame of said vehicle, said sub-frame including a pair of hollow members each comprising a pneumatic reservoir, an axle structure therefor including an axle extending transversely of said sub-frame structure; pneumatic-suspension means including a pair of pneumatic-motor devices secured to each of said axle structure, one of said devices at each side being forwardly and the other rearwardly of the axle, each device having a pressure chamber defined at one side by a movable wall; conduit means interconnecting the pressure chambers of each pair of devices and one of said reservoirs; valve means for each pair of devices for controlling pressure fluid thereto and to the respective reservoirs; means for independently actuating said valves for the application of pressure fluid to the pressure chambers of respective pairs of devices when there is predetermined movement of said structures toward each other to thereby actuate said movable walls for rendering effective said devices to provide pneumatic connection between said devices and said sub-frame.

8. The claim defined by claim 7 wherein there is manual means for relieving the pressure in the pressure chambers of said devices.

9. In suspension means for a vehicle having a frame structure: an axle structure including an axle extending transversely of said frame structure; leaf spring means connected between said frame and axle structure; pneumatic-suspension means including a pair of pneumatic-motor devices secured to each side of said axle structure and cooperating with said leaf spring means to support a load carried by said frame structure, one of said devices at each side being forwardly and the other rearwardly of the axle and each device having a pressure chamber provided with a movable wall and including supplemental load supporting means operatively connected to said movable wall exteriorly of said pressure chamber; conduit means opening into the pressure chambers of each pair of devices and including valve means for each pair of devices controlling the flow of pressure fluid thereto; means for actuating said valves to supply pressure fluid to the pressure chambers of respective pairs of said devices upon a predetermined movement of said axle and frame structures toward each other, the admitted fluid being effective to actuate said movable walls to extend said supplemental load supporting means and render said devices effective to provide pneumatic connection between said devices and said frame.

10. In suspension means for a vehicle having a frame structure: an axle structure including an axle extending transversely of said frame structure; leaf spring means connected between said frame and axle structures; pneumatic-suspension means including a pair of pneumatic-motor devices secured to each side of said axle structure and being cooperable with said leaf spring means to support a load carried by said frame structure, one of said devices at each side being forwardly and the other being rearwardly of the axle and in communication with one another and each device having a pressure chamber provided with a movable wall; conduit means for supplying pressure fluid to the pressure chambers of each pair of devices and including valve means for each pair of devices controlling the flow of pressure fluid thereto; means for independently actuating said valves for the application of pressure fluid to the pressure chambers of respective pairs of said devices upon a predetermined movement of said axle and frame structures toward each other to thereby actuate said movable walls, and means operably associated with said movable wall to provide supplemental pneumatic connection means between said devices and said frame when pressurized air is supplied to said pressure chambers.

11. In suspension means for a vehicle having a frame structure: an axle structure including an axle extending transversely of said frame structure; leaf spring means connected between either side of said frame structure and said axle structure; pneumatic-suspension means including a pair of pneumatic-motor devices in air flow communication with one another and secured to each side of said axle structure, one of said devices at each side being forwardly and the other being rearwardly of the axle, each device having a pressure chamber defined at one side by a movable wall; conduit means opening into the pressure chambers of each pair of devices and including valve means for each pair of devices controlling the flow of pressure fluid thereto; means for actuating said valves for the application of pressure fluid to the pressure chambers of respective pairs of said devices upon a predetermined movement of said frame and axle structures toward each other to thereby simultaneously actuate said movable walls by said fluid and render said devices effective to provide load-supporting pneumatic connection between said devices and said frame and supplement said leaf spring means in supporting a load carried by said frame structure.

12. In suspension means for a vehicle having a frame structure: an axle structure including an axle extending transversely of said frame structure; leaf spring means connected between either side of said frame structure and said axle structure; pneumatic-suspension means including a pair of pneumatic-motor devices in air flow communication with one another and secured to each side of said axle structure, one of said devices at each side being forwardly and the other being rearwardly of the axle and each device having a pressure chamber provided with a movable wall; conduit means opening into the pressure chambers of each pair of said devices and including valve means for each pair of devices controlling the flow of pressure fluid thereto; means for independently actuating said valves to supply pressure fluid to the pressure chambers of respective pairs of said devices upon a predetermined movement of said frame and axle structures toward each other to thereby simultaneously actuate said movable walls, and means operatively associated with said movable wall to provide supplemental pneumatic-cushioning means between said devices and said frame when pressurized air is supplied to said pressure chambers.

13. In vehicle-suspension means: a frame structure; an axle structure; spring means normally supporting said frame structure on said axle structure, normally non-load supporting pneumatic means at each side of one of said frame and axle structures and operably attached thereto to provide, when energized auxiliary, pneumatic load supporting interconnection means between said structures, said auxiliary pneumatic interconnection means normally being disconnected from one of said structures, each said pneumatic means comprising a fluid-pressure-operated device forwardly and rearwardly respectively of said axle structure; and respective pneumatic control means for each pneumatic means, said pneumatic control means having parts operably disposed between said frame and axle structures and engageable upon predetermined relative movement of said axle and frame structures at respective sides thereof toward each other and including means operable when engaged to effect energization of said pneumatic means to render same effective only upon said predetermined relative movement to provide auxiliary pneumatic suspension of the frame structure.

14. The invention defined by claim 13 including manually-operable means for rendering the pneumatic means inoperable.

References Cited in the file of this patent

UNITED STATES PATENTS

| | | |
|---|---|---|
| 1,244,752 | McCrosson | Oct. 30, 1917 |
| 1,278,350 | Hubbard | Sept. 10, 1918 |
| 1,974,171 | Bizzarri | Sept. 18, 1934 |
| 2,257,913 | Maranville | Oct. 7, 1941 |
| 2,361,575 | Thompson | Oct. 31, 1944 |
| 2,864,454 | La Belle | Dec. 16, 1958 |
| 2,903,256 | Weiss | Sept. 8, 1959 |
| 2,945,702 | Winkelmann | July 19, 1960 |

FOREIGN PATENTS

| | | |
|---|---|---|
| 1,012,780 | Germany | July 27, 1957 |